United States Patent

[11] 3,589,403

| | | |
|---|---|---|
| [72] | Inventor | Raymond Burt Chase<br>Midland, Mich. |
| [21] | Appl. No. | 753,276 |
| [22] | Filed | Aug. 16, 1968 |
| [45] | Patented | June 29, 1971 |
| [73] | Assignee | The Dow Chemical Company<br>Midland, Mich. |

[54] NOZZLE LINING REPAIR
2 Claims, 7 Drawing Figs.

[52] U.S. Cl. ................................... 138/177,
29/401, 138/140, 138/147, 220/63
[51] Int. Cl. ................................... F16l 9/00
[50] Field of Search ........................... 29/401;
220/63, 64; 138/140, 147, 177

[56] References Cited
UNITED STATES PATENTS

| 3,148,896 | 9/1964 | Chu | 138/140 X |
| 3,354,913 | 11/1967 | Goto | 138/147 |
| 2,725,159 | 11/1955 | Sanford | 220/64 |
| 3,010,601 | 11/1961 | Holtz | 220/64 |
| 3,365,097 | 1/1968 | Chase | 220/63 |

*Primary Examiner*—John F. Campbell
*Assistant Examiner*—D. C. Reiley
*Attorneys*—Griswold and Burdick and Albin R. Lindstrom ABSTRACT: In a glass or ceramic-lined reactor vessel for use with corrosive contents, to repair damage of glass lining and surface of a nozzle, damaged portions of the nozzle are cleaned and brought to a sound surface; recess is filled with a curable resin; the nozzle and adjacent portions of the reactor vessel are then sheathed with a two piece metal cover, the metal being such as is substantially inert under the conditions of use of the equipment being repaired; the cover comprising essentially an outer facepiece with a returning flange that sheaths the outer edge of the face flange of the nozzle; and a crimped inner facepiece each being produced or fabricated to define a tubular central extension such that as both pieces are in place they mate to sheath nozzle interior completely; any gap between repair sheath and covered surface being filled with a curable resin filler that is inert and insoluble when cured; the nozzle being held securely in place with cooperating inert gasket engaging the crimped interior face as curable resin is cured.

PATENTED JUN 29 1971

INVENTOR.
Raymond B. Chase
BY Thomas J. Page
AGENT

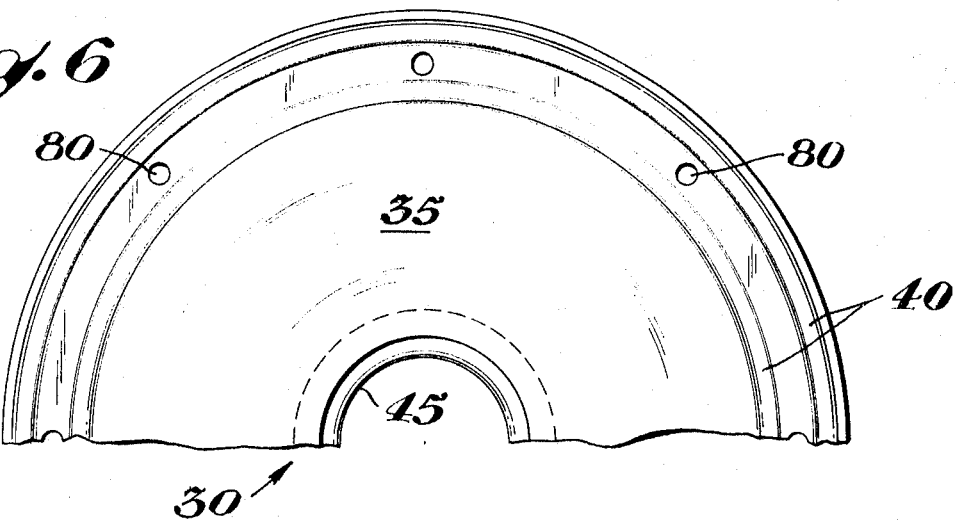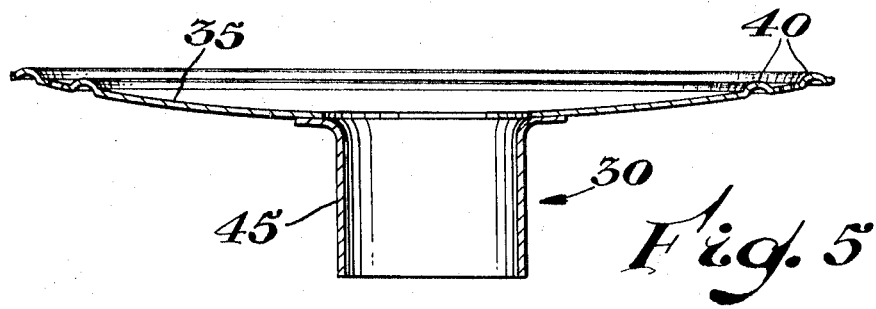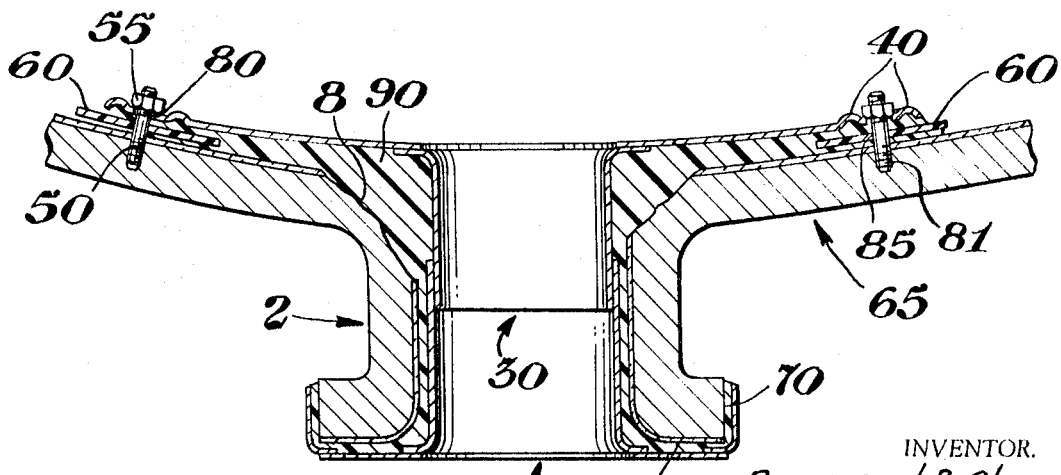

3,589,403

NOZZLE LINING REPAIR

BACKGROUND OF THE INVENTION

1. Field of the Invention

Many important present-day chemical substances including foodstuffs and medicinal materials can be prepared in quantity successfully only through the use of special equipment which does not corrode when in contact with various starting materials, reactants, and products. The use of ceramic or glass-lined equipment has become very widespread in such applications. It gives excellent results, and steel vessels thus lined are very much less expensive than would be comparable vessels made of, for example, nickel, stainless steel, platinum, tantalum, or other metals which are substantially unreactive under most employed conditions. A typical reactor vessel of this sort is prepared by separately forming the various vessel components such as ends, sidewalls, nozzles and the like; joining them together as by welding, finishing interior and other working surfaces to a satisfactory smoothness, coating these surfaces with a water slurry of a glass frit, often containing clay and other substances that react under the application of heat; permitting the frit slurry to evaporate to dryness, and thereafter firing the frit to obtain a continuous glass coating.

Single such coats tend to manifest "pin-holes"; the presence of such flaws is readily detected by the use of electrical discharge probes; where a pinhole extends to the metal base beneath the glass or ceramic coating, a spark travels and the position of the pinhole readily is located. Routinely, such vessels are coated with several coats of glass each from its own frit slurry which is, successively, permitted to dry and fired to obtain a cumulative deposit of glass coating or the like over underlying metal. Such coatings usually are carried over all interior surfaces of the vessel, and, strictly continuously, through the tubular portions and out over or substantially over the flange face portions of nozzles; high into the necks and usually out over the edges and outer flange faces of the necks of manholes, and the like.

Any damage to the reactor vessel which results in a discontinuity in the glass or ceramic coating at a point where, or in such manner that, the exposed metal may come into contact with reactive chemical substances, is inadmissible. Hitherto, inside-outside shields different from the present shield have been used, but they have not been permanent, and at times have not been satisfactory at all.

2. The Prior Art

Various inside-outside nozzle shields for repair in the instance of broken glass coating are known. Representative such shields appear in U.S. Pat. No. 2,714,470, U.S. Pat. No. 2,725,159, British Pat. No. 707,188, and German Pat. No. 943,160. These and related structures are illustrated in "Operation, Maintenance and Repair of Pfaudler Glassed-Steel Equipment," in looseleaf form, published by Pfaudler Permutit Inc., Pfaudler Division, Rochester 3, New York: note section 3, pages 15—19, and especially page 19.

DESCRIPTION OF THE PRESENT INVENTION

The understanding of the present invention is made simpler by reference to the drawings.

FIG. 1 indicates a damaged nozzle in situ;

FIG. 5 shows a section and FIG. 6 a half plan of an inner sheath member; "Inner" and "outer" are to be understood with respect to position in the vessel under repair; and FIG. 7 shows the repaired nozzle with sheath in place.

Now, the figures will be examined in more detail.

Figure 1:
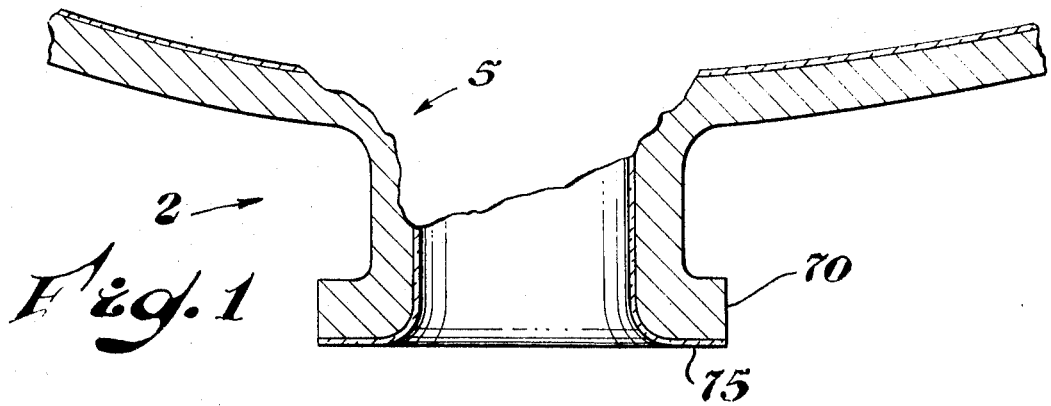
Figure 2:
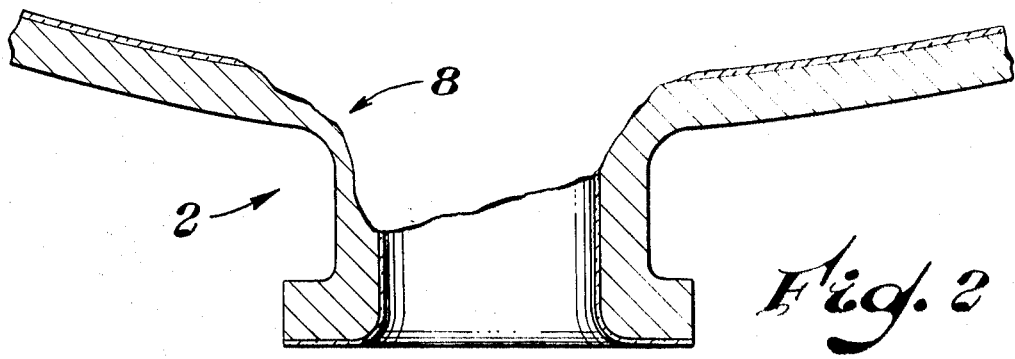
FIG. 2 represents the same nozzle after grinding and finishing to permit repair.

Generally, FIG. 1 illustrates a damaged nozzle 2. The damage 5, indicated in the drawing is representative only, and the exact nature of the damage is not critical to this invention so long as it is confined to the nozzle and immediately adjacent vessel interior. As a first step in preparing the repair of this invention, the damaged area is cleaned and made smooth, as by careful grinding, given any chemical treatment necessary, such as acid or base wash to neutralize remaining traces of corrosive chemical substance, washed, sandblasted or otherwise treated to bring the damaged area into a condition suitable for the application of a permanent repair. FIG. 2 shows nozzle 2 with prepared area 8 where damage 5 had been.

Figure 3:
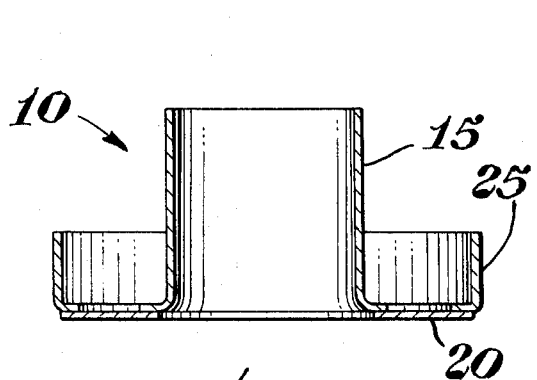
FIG. 3 shows a section and FIG. 4 shows an inverted plan of an outer sheath member.
Figure 4:
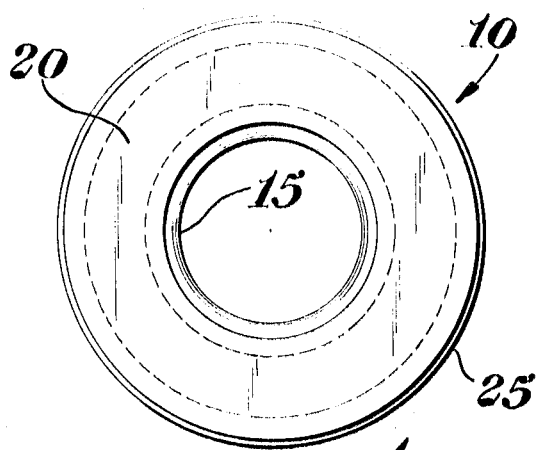

A repair sheath is provided, consisting of a member 10 which, in use, covers the outer aspect of the nozzle and part of its interior tubular neck, as illustrated in FIGS. 3 (section) and 4 (inverted plan). The manner of its fabrication is not part of this invention, but the fabrication in three pieces as here shown permits it to be made of sheet tantalum, an extremely useful metal for patching but very difficult to work. In such fabrication, the sheath is formed as the parts that are, respectively, an inner tubular member 15, an outer face disc 20 defining a central aperture, and an outer cylindrical wall member 25. Inner and outer wall members 15 and 25 are here shown to have been fabricated with wall outer edges folded so as to engage face disc 20 flat to flat; this is available and desirable but, when critical details of the invention are met, is not necessary. However, outer wall member 25 is critical to this invention as is the preparation of fluidtight joints if a plurality of pieces are joined together. Wall member 25 enables a repair made by this invention to be a permanent repair.

It is noted that, in some situations, gold, gold-platinum alloys and laminates, and such other metals as nickel, stainless steel, Monel, Inconel and the like are used; the entire outer member 10 may be fabricated in one piece when the metal of choice is adapted to spinning, deep drawing, and the like.

There is provided also a part 30 (FIG. 5) of the entire cover sheath adapted and intended to cooperate closely with and be employed in a mating relationship with outer member 10, but to be disposed, in use, inside the reactor vessel and proceeding therefrom to sheathe adjacent interior portion of the tubular neck of the nozzle under repair. This is illustrated in section in FIG. 5 and in half plan in FIG. 6.

Inner part 30 is here shown to have been fabricated, and can advantageously be fabricated in two pieces; an inner disc 35 defining a central opening and parallel concentric crimps 40 near to its periphery, and a cylindrical neck member 45 to engage the central opening of disc 35 and to proceed into the tubular neck of the nozzle 2 that is under repair. Neck member 45 is here shown to have a flared end to be disposed interiorly of the vessel bearing nozzle 2, to facilitate its attachment to disc 35, and this manner of fabrication is preferred. However, other shapes and other manners of attachment are available. Neck member 45 can approach disc 35 and meet normal to it and be, in that condition, secured. Inner part 30 can be spun or deep drawn of one piece of metal when the nature of the employed metal admits of it.

It is often the case that flow through a particular nozzle tends to be uniformly in a single direction. When that is the case it is preferred that the tubular members 45 and 15 of inner member 30 and outer member 10, respectively be so disposed as to overlap with the inner overlapping member presenting overlap in the direction of flow. When reciprocal flow is involved, the direction of overlap may be chosen to facilitate flow of substance of greater viscosity, if the reverse flows are of different viscosities; or the overlap direction can be ignored.

Inner part 30 is drilled or punched between parallel crimps 40 to permit installation of studs 50 as is shown in FIG. 7. Spacing of the holes thus provided will be chosen upon the basis of the nature and thickness of the employed metal, and the size of the inner part 30 and of the tubular opening of nozzle 2.

The manner of assembly of the cover sheath of this invention, and of its installation is illustrated in FIG. 7. When area 8 has been prepared and cleaned, a gasket 60, which will commonly be a composite gasket with an exterior cover member of sheet polytetrafluoroethylene, suitably drilled or punched, is disposed to engage the provided parallel concentric crimps 40. All surfaces are coated with a cementitious uncured, curable resin, amounts being sufficient to occupy any voids resulting from injury or from preparation of injured site; at suitable locations the inner wall of vessel 65 is drilled and tapped to receive studs 50; the repair sheath exterior part 10 and inner part 30 are assembled by disposing them into place, exterior part 10 seating squarely and conformingly over the outer wall 70 and outer face, 75, of nozzle 2, and proceeding inwardly of the tubular portion and toward vessel interior. Inner part 30, from within, is disposed over the opening of the nozzle, 2, within the vessel, its stud holes 80 aligned with the tapped holes 81 in the wall of vessel 65 and with corresponding openings 85 through gasket 60.

In this situation, inner part 30 and outer part 10 are approximated, and their tubular sheaths interior to the neck of nozzle 2 telescope, at least slightly, one over the other. Studs 50 may have been installed in advance; if not they are installed at this time; they are of metal having corrosion resistance equivalent to that of the metal of which the cover sheath is made and not of a metal that sets up an electrolytic couple with said sheath; usually studs and nuts are of the same metal as the sheath.

Nuts 55 are now secured; and when inner part 30 has been seated firmly against gasket 60, a clamp of any desired kind (not shown) is applied to hold outer part 10 firmly and accurately in place and, in this condition, any extruded excess resin filler 90 is removed cleanly and uniformly, and resin filler 90 is then cured as by application of heat.

It is usually desired to remove excess length of studs 50 and finish them flush and smooth with nut 55; but this procedure is optional. When tantalum nuts are employed in conjunction with a tantalum patch, they are to be affixed with convex surface approaching the tantalum patch, as is routine in such cases.

In this condition, then, the repair of this invention is regarded as being complete.

I claim:

1. Repair structure for the repair of a nozzle of a nozzle-bearing article said structure comprising essentially a first member and a second member, said first member being adapted to be disposed exteriorly of the nozzle-bearing article and said second member being adapted to be disposed interiorly of said nozzle-bearing article and mating with said first member;

said first member defining an inner tubular part adapted to fit approximately conformingly within and at least partially covering nozzle interior surface, said first member defining also an outer face disc part adapted to fit approximately conformingly over the outer face of said nozzle and defining a central opening that is substantially congruent with nozzle opening and is affixed securely to or is integral with said inner tubular part, said first member defining also an outer cylindrical wall part adapted to fit approximately conformingly over and at least partially covering nozzle face exterior wall surface:

said second member defining an inner tubular part adapted to fit approximately conformingly within and at least partially covering nozzle interior surface and matingly telescoping with inner tubular part of said first member, said second member defining also an inner disc part defining a central opening that is substantially congruent with nozzle opening and is affixed securely to or is integral with said inner tubular part of said second member, said inner disc part defining also parallel concentric crimps near to its periphery and defining holes circumferentially spaced apart between said crimps, said holes adapted to pass fastening means.

2. Repair structure of claim 1 whereof the said first and second members are of tantalum.